(12) United States Patent
Barnes

(10) Patent No.: US 6,360,767 B1
(45) Date of Patent: Mar. 26, 2002

(54) FLUID DISTRIBUTION VALVE

(75) Inventor: Steven R. Barnes, Phoenix, AZ (US)

(73) Assignee: Paramount Leisure Industries, Inc., Phoenix, AZ (US)

( * ) Notice: Subject to any disclaimer, the term of this patent is extended or adjusted under 35 U.S.C. 154(b) by 0 days.

(21) Appl. No.: 09/713,948

(22) Filed: Nov. 17, 2000

(51) Int. Cl.[7] ............................................. F16K 31/16
(52) U.S. Cl. ........................... 137/119.07; 137/624.14; 137/627
(58) Field of Search ............................ 137/627, 119.07, 137/624.14

(56) References Cited

U.S. PATENT DOCUMENTS

| 2,125,513 | A | * | 8/1938 | Martin | .................... 137/627 X |
| 2,644,484 | A | * | 7/1953 | Mansen | ...................... 137/627 |
| 4,592,379 | A |   | 6/1986 | Goettl |   |
| 6,189,556 | B1 | * | 2/2001 | Blake et al. | ........... 137/119.07 |

* cited by examiner

Primary Examiner—Kevin Lee
(74) Attorney, Agent, or Firm—Cahill, Sutton & Thomas P.L.C.

(57) ABSTRACT

The base of a fluid distribution valve is configured to allow a cluster of outlet pipe sockets to extend beyond the outer diameter of the base of the valve to accommodate larger diameter pipes.

3 Claims, 3 Drawing Sheets

FLUID DISTRIBUTION VALVE

TECHNICAL FIELD

This invention is concerned with improving the reliability and performance of distribution valves of the type employed to sequentially direct a fluid, such as water, to a plurality of pop-up cleaning nozzles in a swimming pool or spa.

BACKGROUND ART

This type of valve is well known in the prior art. One particularly successful version of the distribution valve is disclosed in U.S. Pat. No. 4,592,379 granted Jun. 3, 1986 to John M. Goettl for "Fluid Distribution Valve". Many of the features disclosed in the Goettl patent are useful in the valve to which this application is directed and, hence, the Goettl disclosure is incorporated herein by reference.

The valve of the '379 patent can be improved upon.

SUMMARY OF THE INVENTION

Fluid distribution valves are usually installed in an accessible, and hence, visible location. So asthetics of the valve are important. And this, in turn suggests that the valve be made as small as possible.

An important feature of the Goettl '379 patent is that both the inlet pipe socket and the outlet pipe sockets depended from one face of the base of the valve. In that valve the socket grouping was confined within the outside diameter of the valve base. This limited the size of pipe that could be employed with the valve.

According to this invention larger pipe sockets are provided with the outer regions of the pipe sockets extending beyond the outside diameter of the side wall of the base. Thus, larger piping can be used in the system for delivering fluid with less resistance.

The arrangement does not detract from the asthetics of the valve because the sockets are usually buried from view.

BRIEF DESCRIPTION OF THE DRAWINGS

The invention is described in greater detail hereinafter by reference to the accompanying drawings wherein.

BEST MODES FOR CARRYING OUT THE INVENTION

Figure 1:
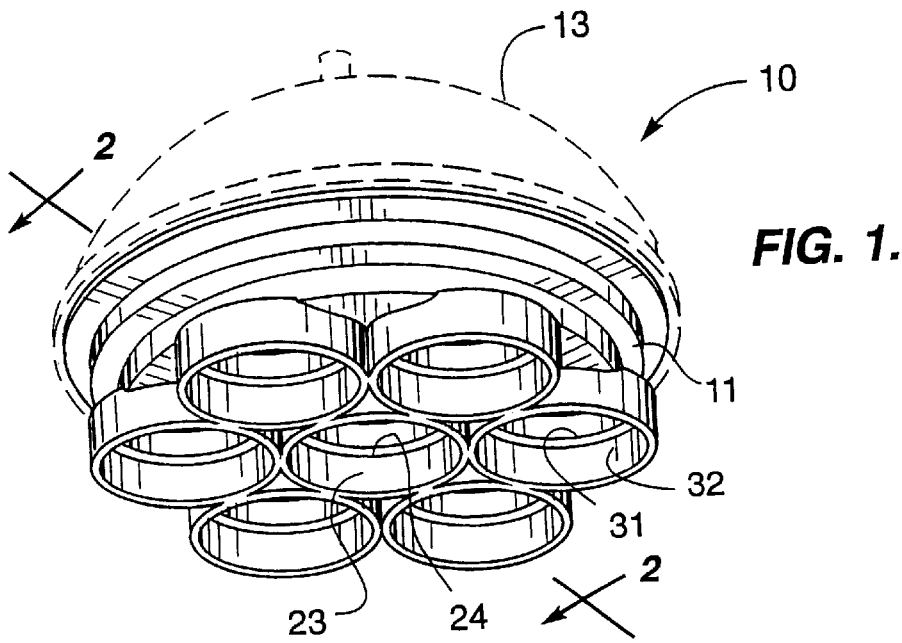
FIG. 1 is a perspective view from beneath the base portion of a fluid distribution valve embodying this invention.

In the drawings the reference numeral 10 designates generally a fluid distribution valve embodying the invention. Valve 10 comprises three principal components, namely, a base 11, a valve module 12 and a cover 13. Cover 13 is shown in phantom in FIGS. 1 and 2 because it plays no significant role in this invention.

The valve base 11 is a cylindrical member preferably integrally molded of plastic material. The base 11 has in the upper region a cylindrical upstanding inner surface 14 which terminates in a circular land, or shoulder, 16. Land 16 is adapted to support a valve shut-off plate 17 forming a part of the valve module 12.

Figure 3:
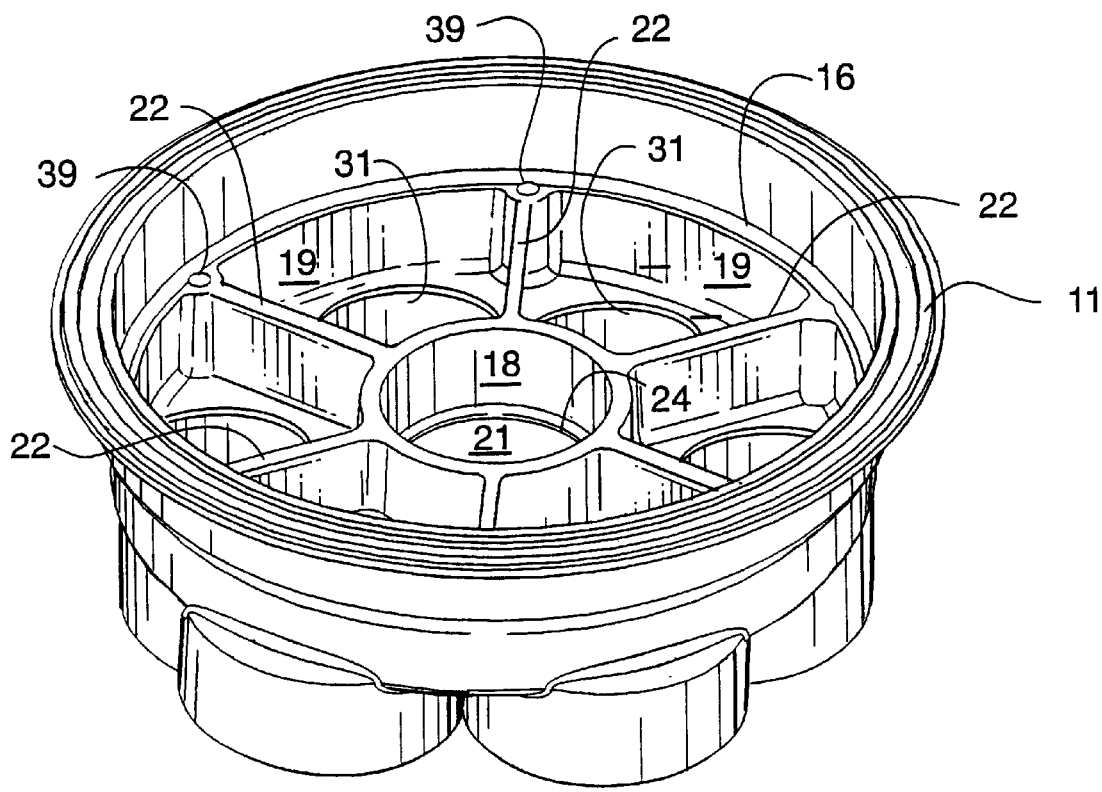
FIG. 3 is a perspective view from above the base of the valve.

The lower region of base 11 is partitioned to form an inlet flow channel 18 and a plurality of oppositely disposed outlet flow chambers 19. Inlet flow chamber 18 is provided by an upright, cylindrical inlet wall 21. Partition ribs 22 extending radially outward from wall 21 to the lower wall portion of the base separate the outlet flow chambers 19. (See FIG. 3.) Fluid enters the valve 10 through a pipe (not shown) connected to a centrally located pipe socket 23 formed on the base 10. An inlet opening 24 in the bottom wall of the base allows fluid to flow into and through inlet flow chamber 18.

Fluid exiting the inlet flow chamber 18 strikes a turbine 26 which drives a valve actuating mechanism 27 forming a component of the valve module 12. Actuating mechanism 27 serially manipulates a plurality of valves 28 for opening and closing openings 29 in the valve shut-off plate 17. For a detailed description of a valve actuating mechanism for this purpose see the aforementioned Goettl '379 patent the description of which is incorporated herein by reference.

Fluid entering each of the outlet flow chambers 19 passes through an outlet opening 31 in the bottom wall of the base 11 into a pipe (not shown) in an outlet pipe socket 32 for delivery to a pop-up cleaning head (not shown).

This invention is concerned with the configuration of the base 11 and this determines the size of the cover 13. For adjustment and repair the valve 10 must be installed in a manner and location in which the cover 13 and the interior of base 11 are accessible. Since this means that the cover 13 will be visible for aesthetic reasons the base and the cover should be as small as possible and no larger than necessary to house the internal components, namely the valve module 12.

Heretofore it was the practice to hold the cluster of outlet pipe sockets 32 to a diameter no greater than the outer diameter of the lower region of the side wall of the base 11. This limited the size of pipe that could be employed in conjunction with the distribution valve. In accordance with this invention the outer diameter of the cluster of outlet sockets 32 is purposely extended beyond the side wall of the base (FIGS. 1, 2 and 3) permitting larger diameter pipe to be used. This reduces the resistance to fluid flow through the piping system.

The desired aesthetic appearance of the valve 10 is not jeopardized because the outlet pipe socket portion of the valve is usually buried and hidden from view.

Figure 2:
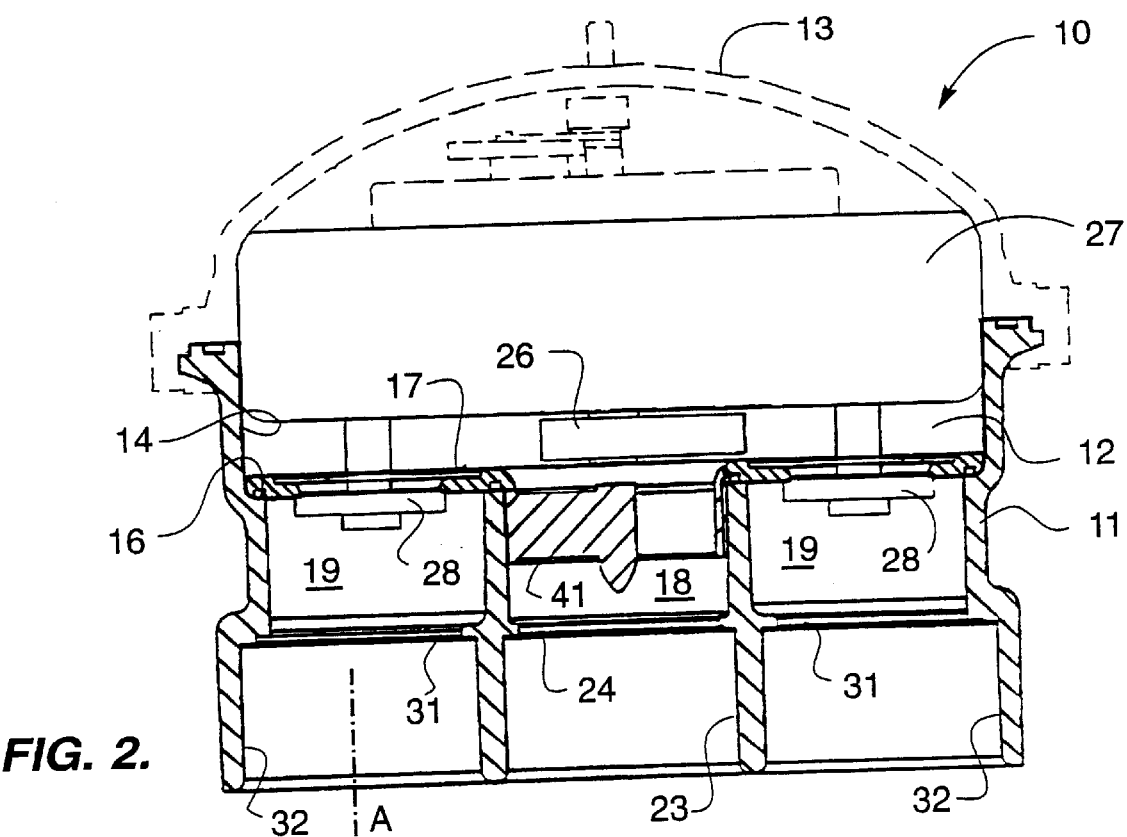
FIG. 2 is a vertical sectional view of the valve taken as indicated by line 2—2 in FIG. 1.

As best illustrated in FIG. 2, the enlargement of the outlet sockets 32 results in the centerline "A" of the outlet sockets being disposed radially outwardly of the centerline "B" of its valve 28.

Another feature of the fluid distribution valve of this invention is improvement of the sealing relationship between the valve shut-off plate 27 and land 16 on the valve body side wall, the inlet wall 21 and the ribs 22 to minimize leakage between the outlet flow chambers 19. Two techniques are employed for this purpose.

Figure 4:
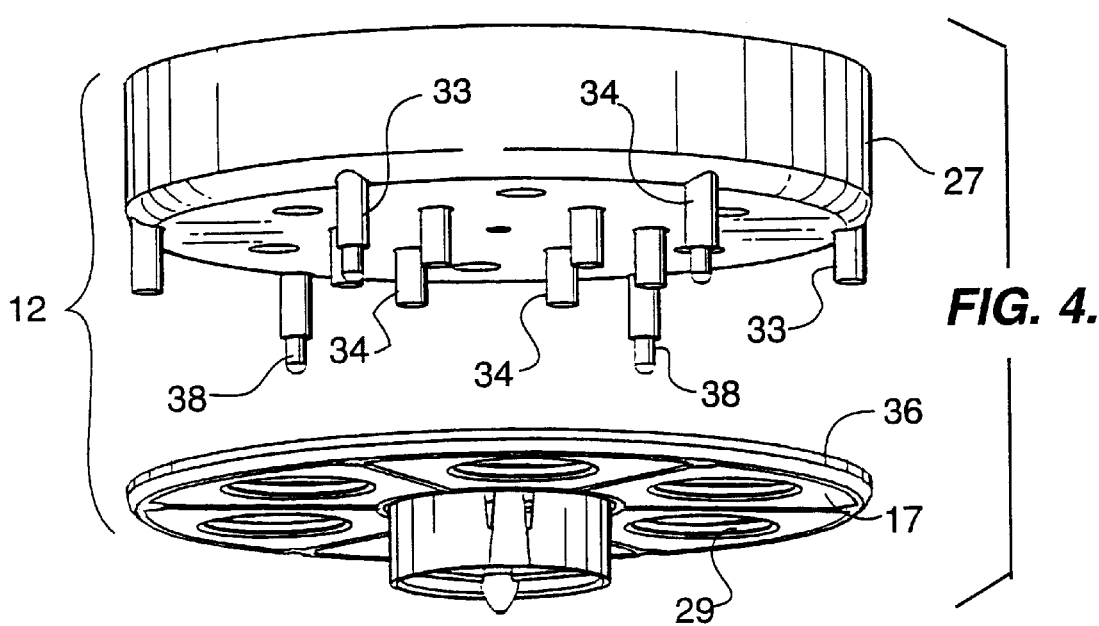
FIG. 4 is an exploded perspective view of a valve shut-off plate and a valve actuating assembly of the valve.

The first such technique involves providing strategically placed posts 33 and 34 depending from the valve actuating mechanism 27 to the valve shut-off plate 17. (See FIG. 4.) The outer ring of posts 33 bear down on and transfer the weight of the valve actuating mechanism 27 to the periphery 36 of the shut-off plate. The inner ring of posts 34 are positioned to apply this weight to the portion of the shut-off plate 17 over the partition ribs 33. This arrangement effectively precludes bending or flexing of the shut-off plate 17 during operation.

Figure 5:
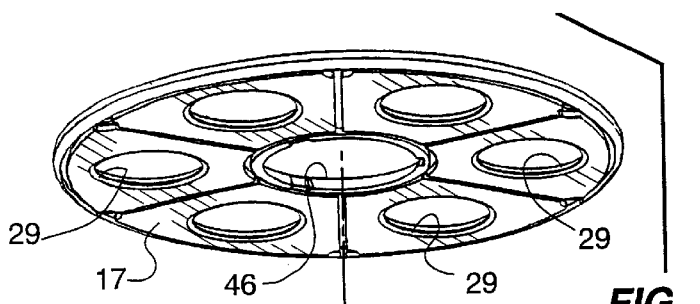
FIG. 5 is an exploded perspective view of a valve shut-off plate, a gasket and a flow control member employed in the valve.

The second technique with sealing in mind is the provision of a gasket 37 between the shut-off plate and the ribs 22. (See FIG. 5.) This wagon wheel-like gasket effectively seals the outlet flow chambers 19 from each other.

It is important that the valve module 12 be properly rotatively oriented with respect to the outlet flow chambers 19. In other words it is important that the valves 28 be aligned with respective outlet flow chambers 19. To this end the valve module 12 and the land 16 on the base side wall are provided with alignment members which cooperate when the valve module 12 is properly placed in the valve base 11. The preferred arrangement involves providing one or more pins 38 at the base of one or more posts 33 depending from the valve actuating mechanism 27. (See FIG. 4.) These pins 38 cooperate with openings 39 in land 16 to position the valve module 12. (See FIG. 3.)

One further feature of the fluid distribution valve 10 of this invention is a provision for changing the frequency at which the valve operates. This involves the provision of a flow control member 41 in inlet flow chamber 18 ahead of the turbine 26.

Figure 6:
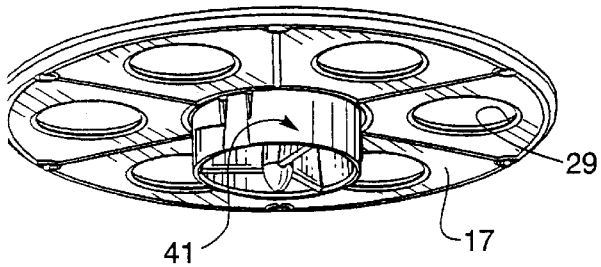
FIG. 6 is a perspective view showing the flow control member attached to the valve shut-off plate.

The control member 41 may take several forms. In the form illustrated in FIGS. 2, 5 and 16 the member 41 has a plurality of vanes 42 inside a cylindrical housing 43. The member housing 43 has a resilient tab 44 which permits the member to be snap fitted in a central opening 46 in the shut-off plate 17. (See FIGS. 5 and 6.) In this configuration, when it is desired to change the rate of rotation of the turbine 26 and, hence, the frequency of operation of valve 10, the control member 41 can be removed and replaced with a similar member having a different configuration of blades 42.

Figure 7:
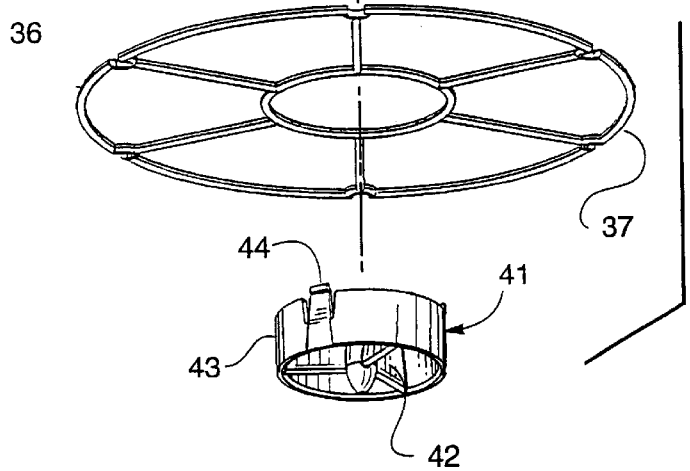
FIG. 7 is a perspective view of a modification of the valve shut-off plate.
Figure 7:
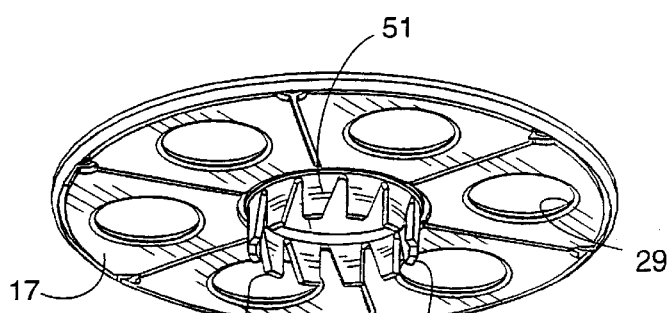
Figure 8:
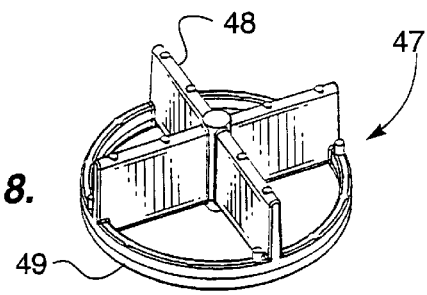
FIG. 8 is a perspective view of a modified flow control member for attachment to the valve shut-off plate of FIG. 7.

A slightly different control member, designated 47, is shown in FIGS. 7 and 8. Member 47 is preferably molded of a pliable material to form bendable vanes 48 carried by a ring 49. This member 47 is adapted to be snapped into place between resilient fingers 57 depending from shut-off plate 17. Bending the vanes 48 of control member 47 alters the flow to the turbine 26.

There is a further advantage to providing flow control members such as 41 and 47. Either is capable of inducing a consistent twist to the fluid flowing to the turbine 26 correcting any unusual flow conditions associated with the plumbing feed line.

From the foregoing it should be apparent that the fluid distributing valve of this invention possesses a number of improvements over prior valves.

What is claimed is:

1. A fluid distribution valve comprising:
   a) a generally cylindrical base having a bottom wall and an upstanding side wall having an outside diameter;
      i) the bottom wall of said base having a centrally located inlet therein and a plurality of outlets therein,
      ii) said outlets being oppositely disposed outwardly of the inlet;
   b) said base having a downwardly depending pipe socket communicating with said inlet and a downwardly depending pipe socket in communication with each of said outlets; and
      i) the outer regions of the downwardly extending pipe sockets communicating with said outlets extending beyond the outside diameter of the side wall of the base thereby providing for a larger inlet pipe to and larger outlet pipes from a smaller diameter base.

2. The fluid distribution valve of claim 1 wherein:
   a) said base and said pipe sockets are formed as a unitary structure.

3. A fluid distribution valve comprising:
   a) a generally cylindrical base having a bottom wall and an upstanding side wall having an outside diameter;
      i) the bottom wall of said base having a centrally located inlet therein and a plurality of outlets therein,
      ii) said outlets being oppositely disposed outwardly of the inlet;
   b) said base having a downwardly depending pipe socket communicating with said inlet and a downwardly depending pipe socket having a centerline and in communication with each of said outlets;
      iii) the outer regions of the pipe sockets communicating with said outlets extending beyond the outside diameter of the side wall of the base thereby providing for a larger inlet pipe to and larger outlet pipes from a smaller diameter base; and
   c) a valve having a centerline and disposed in the base for each of said pipe sockets in communication with each outlet,
      iv) the centerline of each outlet socket being disposed radially outwardly of the centerline of each respective valve.

\* \* \* \* \*